(12) United States Patent
Cook et al.

(10) Patent No.: US 6,759,000 B2
(45) Date of Patent: Jul. 6, 2004

(54) METHOD OF MAKING A FILTERING SCREEN AND SUPPORT FRAME THEREFOR

(75) Inventors: Gordon James Cook, Newtonhill (GB); Andrew Hughes, Edinburgh (GB); Arthur Robert Bailey, Sutton Coldfield (GB); George Charles Hartnup, Gorebridge (GB); Dugald Stewart, Edinburgh (GB)

(73) Assignee: United Wire Ltd., Edinborough (GB)

(*) Notice: Subject to any disclaimer, the term of this patent is extended or adjusted under 35 U.S.C. 154(b) by 133 days.

(21) Appl. No.: 10/025,070

(22) Filed: Dec. 19, 2001

(65) Prior Publication Data

US 2002/0088531 A1 Jul. 11, 2002

Related U.S. Application Data

(62) Division of application No. 09/367,379, filed as application No. PCT/GB98/00601 on Feb. 25, 1998.

(30) Foreign Application Priority Data

Mar. 1, 1997 (GB) ............................................. 9704332
Sep. 19, 1997 (GB) ............................................. 9719850

(51) Int. Cl.[7] ............................................. B29C 45/14
(52) U.S. Cl. .................... 264/279; 264/261; 264/271.1; 264/277; 264/328.1
(58) Field of Search .......................... 264/271.1, 328.1, 264/261, 277, 279, 264; 210/489, 490, 499

(56) References Cited

U.S. PATENT DOCUMENTS 2,723,032 A * 11/1955 Gisler et al. ................. 209/401
4,861,462 A * 8/1989 Lehmann et al. ............ 209/269
5,076,924 A * 12/1991 Persson et al. .............. 210/474
5,137,622 A * 8/1992 Souter ......................... 209/403
5,626,234 A * 5/1997 Cook et al. .................. 209/315
5,851,393 A * 12/1998 Carr et al. ................... 210/489
6,202,857 B1 * 3/2001 Keller et al. ................ 209/404
6,237,780 B1 * 5/2001 Schulte ....................... 210/388
6,305,549 B1 * 10/2001 Riddle et al. ............... 209/403

OTHER PUBLICATIONS

Rosato, Donald V. and Dominick V. Rosato. Injection Molding Handbook (2nd ed.). New York: Chapman and Hall, 1995. p. 218.*

* cited by examiner

Primary Examiner—Michael Colaianni
Assistant Examiner—Monica Fontaine
(74) Attorney, Agent, or Firm—Barnes & Thornburg

(57) ABSTRACT

A method of constructing a frame (10) for a filtering screen from a polymer material is described in which a wire frame reinforcement is wholly encapsulated during the frame moulding process so that two parallel spaced apart wires extend through each of the intersecting orthogonal ribs (14, 16) which define the open area of the frame (10) across which the wirecloths (158, 159) are stretched. The surfaces of the frame (10) in which the wirecloths (158, 159) are embedded are formed with ridges (22, 30, 32) and the crests of the latter extend to different heights. The crests are softened by heating during the manufacturing process and the wirecloths (158, 159) stretched over the frame (10) are forced into the softened crests after which the assembly is allowed to cool and cure. The frame (10) is re-usable by stripping wirecloths (158, 159) from the top of the frame (10) and fitting fresh wirecloths over the plastics material and heating the regions which are to encapsulate the fresh wirecloth.

16 Claims, 12 Drawing Sheets

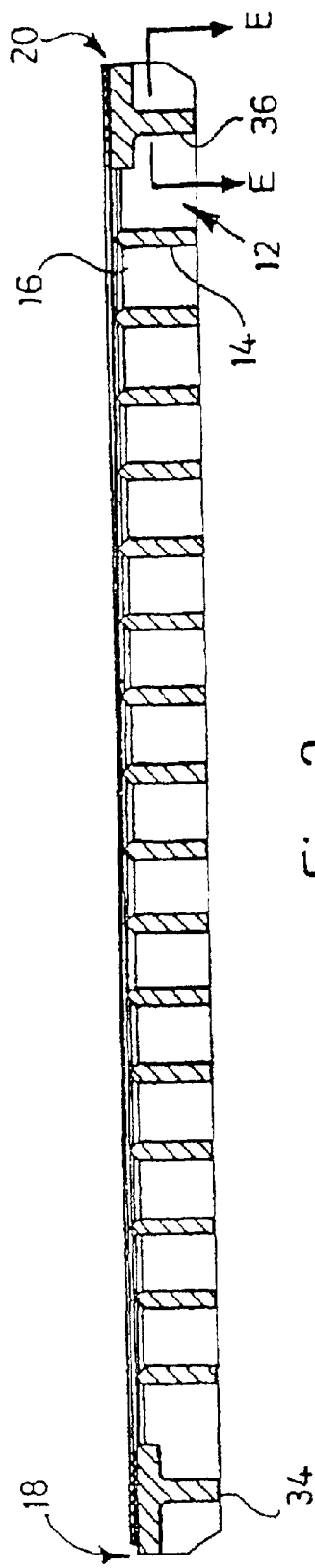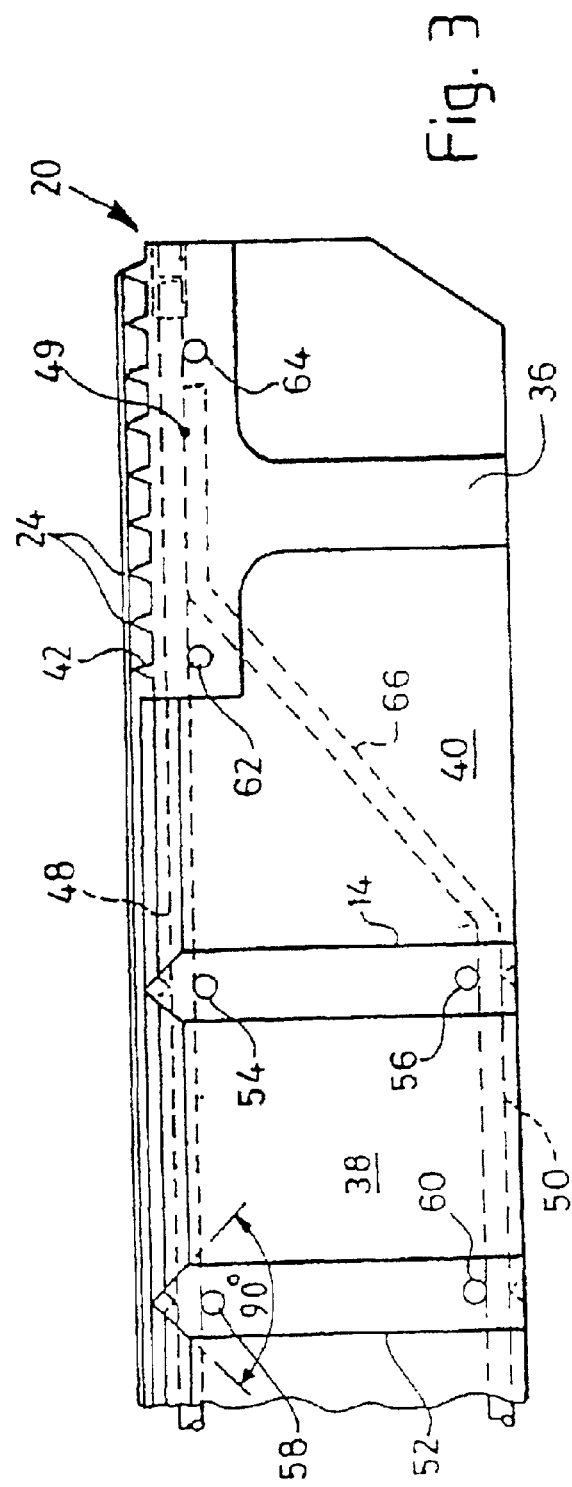

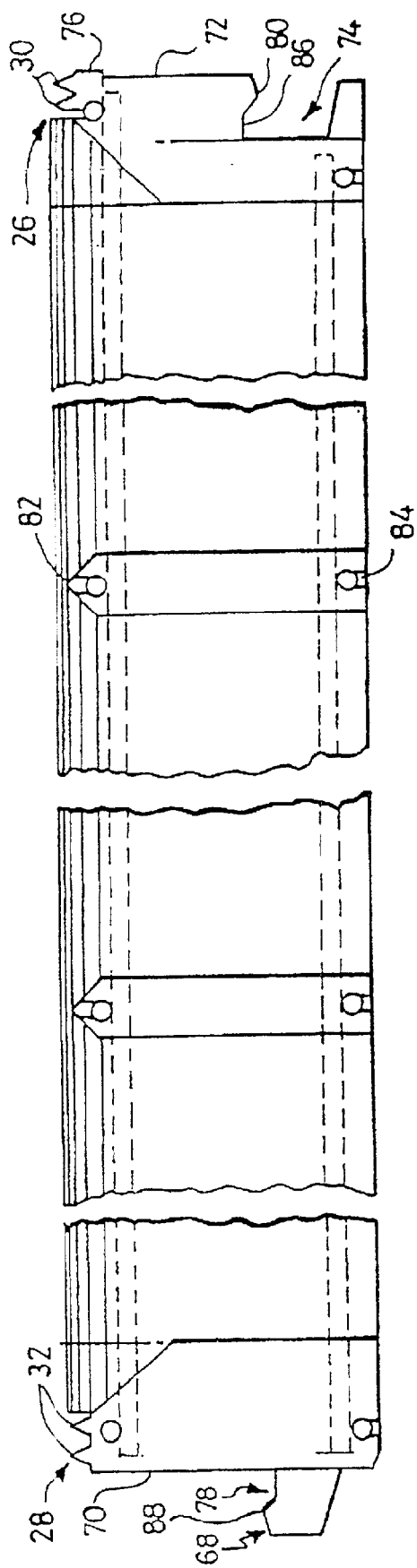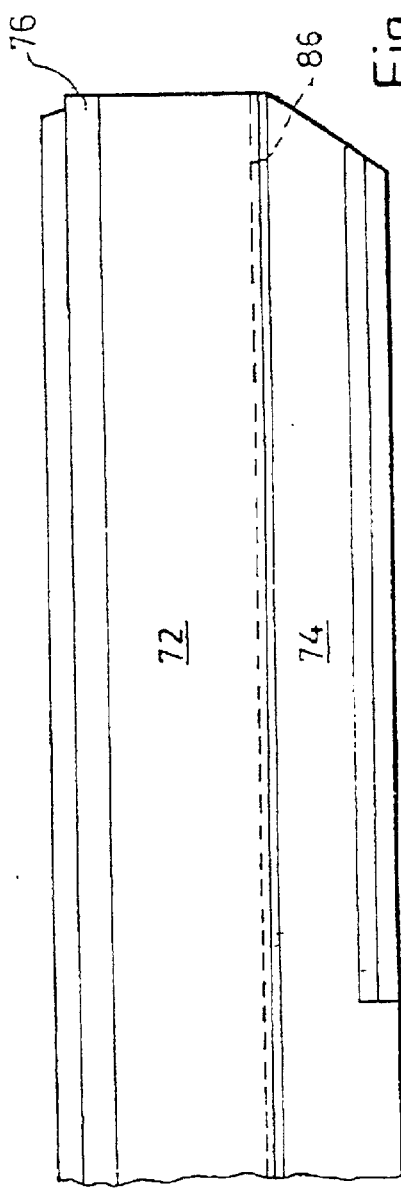

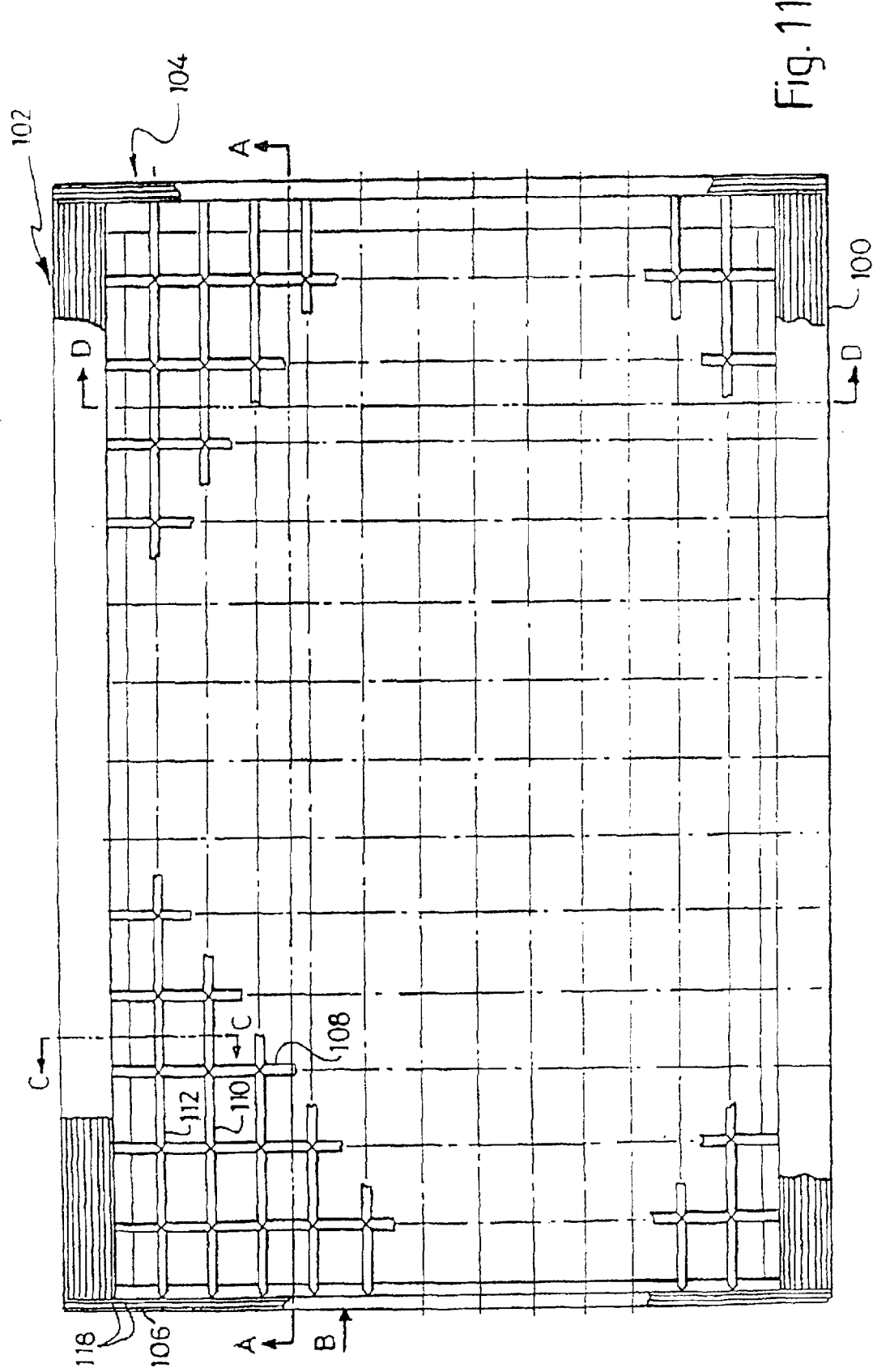

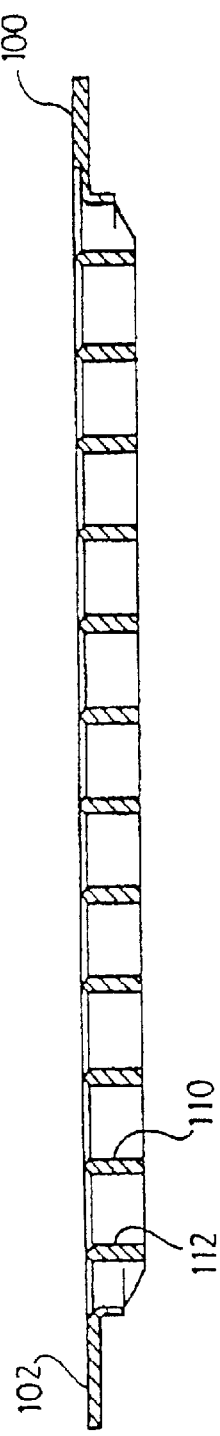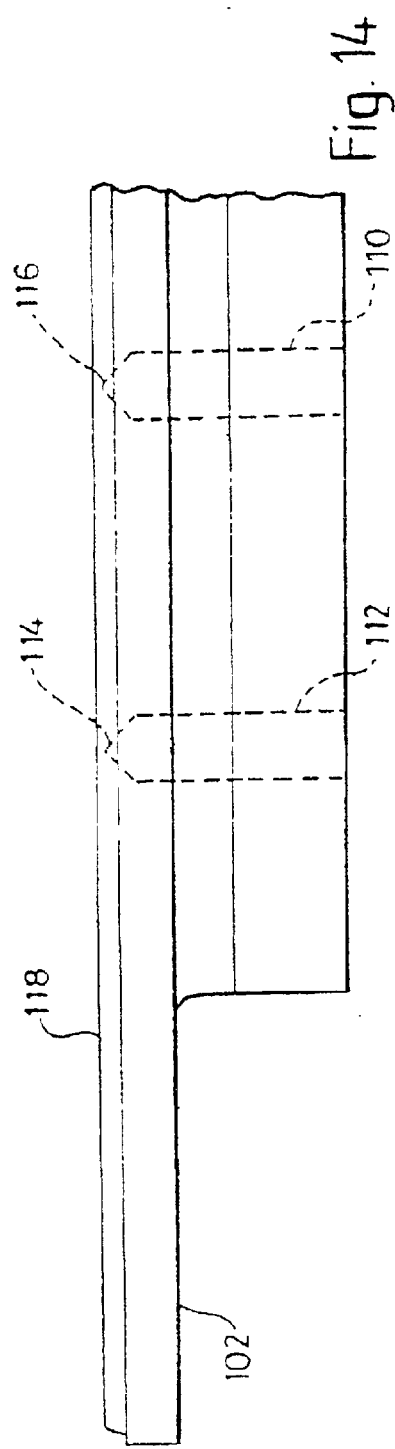

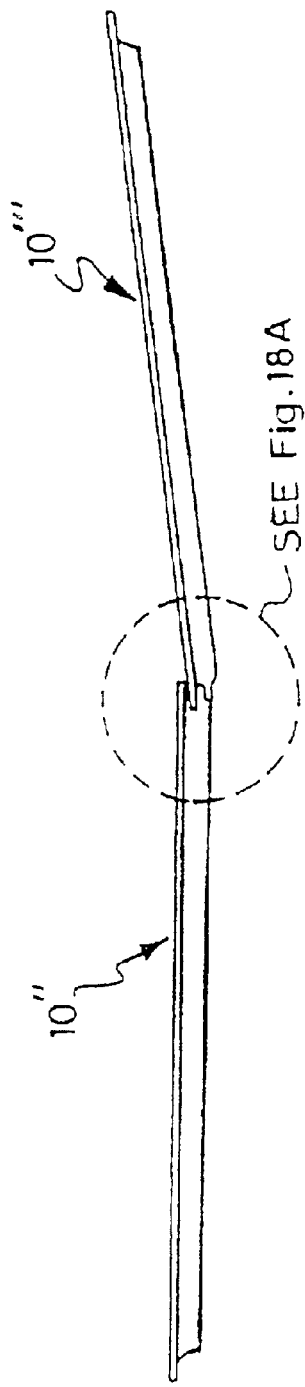
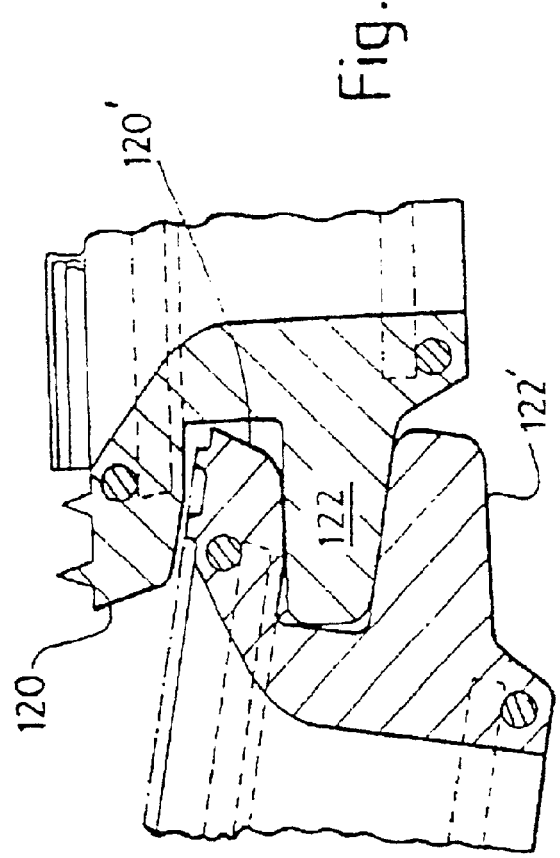

6,759,000 B2

METHOD OF MAKING A FILTERING SCREEN AND SUPPORT FRAME THEREFOR

Related Application

This application is a division of copending U.S. patent application Ser. No. 09/367,379, filed Nov. 1, 1999, which is a national stage entry of PCT/GB98/00601, International Filing Date Feb. 25, 1998.

FIELD OF INVENTION

This invention concerns screens for use as filters in vibratory filtration equipment such as shakers that are used in the oil drilling industry for separating solids from the liquid phase of oil and water based muds retrieved from drilling operations. In particular the invention is concerned with the construction and manufacture of supporting frames over which filtering material such as woven wire cloth is stretched and secured to form the screens and to the re-use of such frames.

BACKGROUND

Examples of filtering machines in which such screens are used are contained in UK 2237521 and UK 2229771.

One such screen is described in PCT/GB95/00411 (W095/23655).

The earlier design of screen extends the life of a screen by providing a sacrificial support cloth of woven wire below an upper woven wire cloth of harder wearing material than that of at least the surface of the wire from which the lower cloth is woven, so that wear due to rubbing and vibration during use occurs to a greater extent in the lower cloths than in the upper cloth. The specification also describes an improved design of frame across which woven wire cloths can be tensioned and bonded by adhesive, to form a sifting screen, in which the frame is proposed to be formed from glass reinforced gas blown polypropylene with elongate metal reinforcing elements or rods buried in the GRP. The improved frame construction is shown in FIGS. 3 to 8 of the earlier specification.

It is an object of the present invention to provide an improved method of constructing such a frame and an improved frame for use as the support for layers of woven wire cloth, an improved screen formed-from such a frame, and a frame which can be reused under some circumstances.

SUMMARY OF THE INVENTION

According to one aspect of the invention, a method of constructing a polymer support frame over which woven wire cloth is to be stretched and secured to form a sifting screen comprises the steps of locating in a mould tool a wire frame assembly comprising two parallel spaced apart arrays of reinforcing wires, closing the tool, injecting liquid polymer so as to wholly encapsulate the wire frame and to form an article having an open central region crisscrossed by intersecting orthogonal ribs bounded on all sides by a rigid flange, in which each of the ribs includes two parallel spaced apart wires of the said wire frame assembly, permitting the polymer to cure, and opening the tool, and removing the moulded article.

By arranging for two parallel spaced apart wires to extend through each of the ribs, one near one edge and the other neaer to the opposite edge of the rigs, each rib has the stiffness of a beam, and the resulting frame has high rigidity and resistance to bending, yet remains relatively lightweight.

Preferably the wire frame is selected so as to impart sufficient structural rigidity to the support frame as to prevent deflection thereof and consequent changes in the tension in the wire cloth when fitted thereto.

Additionally the wire frame is selected so as to impart sufficient strength to the support frame as to allow the latter to withstand shear stresses introduced as the frame is clamped into a vibratory screening machine.

Typically the wire frame is formed from high tensile straightened steel wire, bent as required, and in a preferred arrangement the wire is of 2.5 mm diameter.

The invention also provides a method of making a reinforcing wire frame for use in the above method of making a support frame, comprising the steps of:

equally spacing apart cut lengths of wire in a jig to form a first array, locating thereover a second equally spaced array of cut lengths of wire at right angles to the first array, resistance welding the wires of the two arrays at all the points of intersection so as to form a first rectilinear matrix similarly positioning two similar arrays of similarly cut lengths of wire in a jig and resistance welding the points of intersection of the orthogonal wires so as to form a second, similar rectilinear matrix, bending in a press break the protruding lengths of wire on at least two of the four sides of one of the rectilinear matrices, so as to bend each protruding section first in a generally upward sense and then at a point nearer to its end in a downward sense so that the end region of each protruding length extends parallel to the plane containing the matrix, but is displaced therefrom, and and thereafter resistance welding the displaced ends of the protruding wires of the said one matrix to the protruding ends of the wires of the other matrix.

The welding may be in part effected through the intermediary of transversely extending filler wires, so that intersections are provided where welds are to be formed between parallel protruding ends of the reinforcing wires, and the filler wires facilitate the resistance welding of the parallel protruding ends.

Preferably the wire frame fabrication is assembled so that each matrix is bowed in an outward sense, opposite to the other.

During moulding it has been found that the pressure within the mould tool can distort the framework so that the outward bowing of the opposite faces of the framework can be replaced by significant inward bending—so destroying the alignment of the long rods within the upper and lower edges of the interstices of the moulded frame. To avoid this it is proposed that at least one spacer is located within the framework, so that if there is any tendency for the rod arrays to collapse inwards, the spacer will present this collapse occurring.

Preferably a plurality of spacers are located within the wire frame fabrication, each attached to one or other of the matrices so as to extend towards the other, whereby any tendency for the matrices to collapse inwards during moulding, is resisted by the spacers.

In one embodiment each spacer comprises a length of wire bent to form a shallow U with its two ends bent outwards to form two in-line lugs by which it can be welded to the underside of one of the wires which form one of the matrices, with the crest of the U section in close proximity to one of the wires of the other matrix, whereby the spacer will maintain a given dimension between the two matrices if the fabrication is subjected to a collapsing force during moulding, so causing the crest to engage the said wire of the other matrix.

The invention also provides a method of moulding a support frame in a mould tool as aforesaid around a wire frame fabrication as aforesaid wherein an inward force is exerted on opposite faces of the fabrication within the mould tool by fingers protruding inwardly from the inside faces of the tool, to externally engage the opposite matrices of the fabrication when the tooling closes.

In accordance with this method, the fingers sandwich the fabrication in position and produce just the required inward movement of the two oppositely bowed matrices to render them parallel and spaced apart by the desired distance.

Typically the fingers comprise inwardly projecting pegs which align with crossing points of wires in the upper and lower reinforcing matrices, to space the matrices from the corresponding upper and lower internal surfaces of the mould tool and ensure that the matrices are buried within the plastics material which is injected into the mould tool during the manufacturing process.

Preferably the ends of the peas taper to an edge, or a point.

After the mould tool is opened and the protruding pegs disengage from the struts, openings are left in the polymer. Preferably therefore the method further comprises plugging the openings with plastics material or filler.

Typically the wire frame fabrication is supported within the tooling by means of retractable pins which protrude through the tooling wall to engage the fabrication and accurately locate it within the tooling.

The pins may be retracted as the tooling opens after the moulding step has been completed.

Conveniently the pins align with protruding ends of wires making up the fabrication and are separably joined to the ends of the wires by means of sleeves of plastics material opposite ends of which receive the pins and the reinforcing wire ends respectively.

Preferably the passage through each sleeve is blocked so as to form two coaxial blind bores, and each sleeve becomes embedded in the polymer during moulding and remains in the polymer as the pin which engages it is retracted as the tooling is opened, the blocked passage serving to encapsulate the end of the wire end located in the inner end of the sleeve.

Prior to moulding the tool may be fitted with pegs formed from a plastics material which is compatible with or is the same as the polymer material which is to be injected into the mould to encapsulate the wire frame fabrication, and the pegs become integrally bonded therein during moulding so that when the tool is opened, the pegs separate from the tool, and remain in the frame.

Protruding portions of each peg may be removed by grinding or filing or cutting.

The invention thus provides a support frame of polymer material having wire reinforcing thereon and to which woven wirecloth is to be bonded to form a filtering screen, in which the frame is constructed as aforesaid.

The invention also provides a filtering screen comprising a support frame of polymer material with wire reinforcing therein constructed as aforesaid, and having at least one woven wirecloth tensioned thereover and bonded to one surface thereof.

It is generally desirable for the wires of the cloths to be taut and under tension in the finished product and to this end the wirecloths wires are put in tension whilst the plastics material is allowed to cool and set hard, to bond the woven wire cloths to the frame.

This aspect of the invention is so particular advantage in that by using a suitable polymer for the frame material and heating the surfaces in contact with the wire cloths, so the need for an adhesive is obviated as is the step of applying the adhesive.

It is of course necessary to select a plastics material which is suitable to serve as a bonding medium for woven wire cloth and it has been found that polypropylene and polyethylene are suitable plastics materials although the invention is not limited to the use of polypropylene and polyethylene.

Whether polyethylene or polypropylene is used, it has been found advantageous for either material to be gas blown and glass fibre reinforced.

In a preferred arrangement, the wirecloth which is first fitted over the support frame has a coarser mesh than any subsequent layer of wirecloth fitted thereover.

In particular the invention provides a filtering screen having two layers of woven wirecloth fitted thereover and bonded thereto, in which the lower wirecloth has a coarser mesh than the upper wirecloth and in which the tension in the wires forming the upper wirecloth is less than the tension in the wires forming the lower wirecloth.

According to another aspect of the invention, a wire frame reinforcing fabrication for a support frame as aforesaid, is formed from resistance welded steel wire matrices arranged in two parallel spaced apart planes and themselves welded together along at least two edge regions by welds between protruding ends of the wires of the two matrices.

According to another aspect of the invention, in a method of forming a wire frame reinforcing cage for incorporating in a mould tool for moulding a polymer material therearound to form a support frame for a filter screen, wherein the cage is constructed from two similar rectilinear arrays of resistance welded wires, the method involves bending protruding wires along at least two sides of one of the arrays and welding the ends of the bent portions of the wires of the one array to the protruding ends of the wires in the other array, so as to maintain separation between the two matrices.

According to a further aspect of the invention, a method of constructing a filter screen comprises the steps of forming a polymer support frame having wherein a plurality of similarly sized rectilinear apertures defined by an integral rectilinear matrix of wire reinforced struts of polymer material, in which the upper edge of each strut, and the upper surface of each boundary of the support frame, is ridged, and in which the woven wirecloths are fitted over the ridges, tensioned, and secured in place by heating at least the ridges so as to soften the polymer material therein sufficiently to allow the wirecloths to penetrate the crests thereof and upon cooling to remain embedded therein, so as to maintain tension in the wires of the wirecloths after cooling.

The method may also involve the step of differentially tensioning the wires in one wirecloth relative to those in the other, so that different tensions exist in the wares of the two cloths after bonding to the polymer support frame.

The reinforcing matrix is preferably formed from high tensile steel wire of nominally 2.5 mm diameter, and glass reinforced gas blown polypropylene polymer is injected into the mould tool under pressure and is left to cure for a given period of time, and the moulded support frame then removed, a first woven wirecloth of nominally 30 mesh formed from stainless steel wire of nominally 0.28 mm diameter is fitted over the support frame and tensioned, a second woven wirecloth is fitted over the first wirecloth, the second cloth being formed from wire having a smaller diameter and a finer mesh size than the first cloth, and is likewise tensioned, a force is applied over the face of the support frame carrying the overlaid wirecloths, heat is applied to soften the crests of the ridges and to allow the two cloths to become embedded in the crests of the ridges such that after the heating and force is removed and the frame has cooled, the cloths remain bonded to the crests of the ridges and residual tensions exist in the wires forming the two cloths.

In a support frame which is to have woven wirecloth bonded to the one face thereof by locally heating the frame material and forcing the wirecloth wires into the softened material before it is allowed to cool and harden again, and which is formed from glass reinforced plastics material having embedded therein a reinforcing wire frame constructed as aforesaid, preferably the thickness of the plastics material between the reinforcing wires and the face of the support frame members to which the woven wirecloth is to be bonded is selected so as to be sufficient to enable the wirecloth to be embedded therein without making contact with the reinforcing wires.

Preferably the plastics material comprises a polypropylene or a polyethylene, and may be gas blown and glass fibre reinforced.

According to a preferred feature of the invention, in a support frame which is formed from glass reinforced plastics material, the faces of the peripheral edge regions of the support frame which woven wirecloth is to overlay and to which the cloth is to be bonded by heating, are formed with a plurality of closely spaced apart parallel ridges so that when the surface is heated, the crests of the ridges soften, and woven wirecloth laid thereover and tensioned can, under an appropriate downward loading, penetrate and become embedded in the softened crests.

In a method or constructing a filter screen using a support frame as aforesaid the heat is preferably applied through the woven wirecloth so as to preferentially heat the crests of the ridges as opposed to the remainder of the support frame.

In a support frame as aforesaid, which is generally rectangular, the ridges along each of the four sides run parallel to the length dimension of each side so that the ridges in the surfaces of the four edges of the frame run perpendicular to the direction in which woven wirecloth is tensioned relative to those edges.

Where the frame includes a matrix of wire reinforced struts defining within the boundary of the frame a plurality of openings, sufficient plastics material exists in each of the struts between the internal wire reinforcement therein and the cloth engaging surface thereof, to enable the strands of wire forming the wirecloth also to become embedded in the struts when the frame is heated and an appropriate force is applied, without the wirecloth contacting the internal reinforcing wires, to prevent electolytic action between wirecloth and reinforcing wires where different metals are used.

According to another preferred feature of the invention, in a support frame as aforesaid, constructed from glass fibre reinforced plastics material over which wirecloth is to be stretched and bonded thereto to form a sifting screen and which includes a matrix of struts within a perimeter flange of the frame, the thickness of the cloth engaging ends of the struts is less than that of the more remote regions of the struts.

Preferably the wirecloth engaging edge of each strut is of reduced section, and on heating the wirecloth wires become embedded in the said reduced strut sections.

The reduced strut section is preferably created by forming a ridge along the wire receiving edge thereof.

The invention thus also provides a support frame formed from glass fibre reinforced plastics material over which wirecloth is to be stretched for bonding thereto to form a sifting screen, and which includes an outer peripheral flange surrounding a central region occupied by an integral matrix of interconnecting struts wherein the flange and struts are ridged where they are to engage the wirecloth and the ridges extend to different heights so that the crests lie in different parallel planes.

Preferably the crests of the ridges of the struts defining the integral matrix lie in a first plane, which is below a second plane containing the crests of the ridges on the surrounding flange.

In a method of covering a support frame as aforesaid, heat is preferably applied uniformly over the entire face of the support frame by means of by a flat heated platen which forces the wirecloth into the crests of the ridges and the wirecloth has to be pressed into the crests of the ridges on the surrounding flange before it can enter the crests or the ridges on the struts making up the integral matrix.

In such a support frame, outer ridges on some or all of the surrounding flange may extend to a greater height than inner ridges on the flange, so that the crests of the outer ridges occupy a third plane above the second plane, whereby there is a greater volume of polymer to be melted and spread by the application of heat and pressure to the wirecloth near the outer edges of the peripheral flange, than is the case near the inner regions of the flange.

By forming ridges along the wire cloth engaging edges of the struts, so the area of the woven wire cloth which is actually blinded by being embedded in plastics material is reduced to the minimum necessary to achieve support for the cloths. Thus although the struts may have a lateral width considerably greater than the width of their crests, the area of the woven wire cloth which is available for filtering liquid is only reduced by the narrow width of the melted crests and is not reduced by the total area of the struts, which would be the case if the width of the cloth engaging face of the struts is the same width as the struts themselves.

The struts have so far been described as being ridged and in general they will have a symmetrical cross-section in which the crest is mid-way between two parallel sides of the strut, and the ridge can be thought of as an isosceles triangulation at the upper end of a rectangular cross-section of the remainder of the strut. However this configuration is merely a preferred form, and the triangular cross-section of the upper region of the strut may be offset so that the crest of the ridge is displaced towards one side or the other of the strut when viewed end on and if the triangle is a right angled triangle the crest will be aligned with one side or the other of the rectangular section of the strut, the hypotenuse of the triangle forming a sloping surface between the crest of the ridge and the other edge of the rectangular strut region.

In general the primary purpose of the ridging of the struts is to reduce the width of the plastics material which is to engage the woven wire cloth, and the ridging effect can be obtained simply by reducing the width of the strut lust below its face which is to be bonded to the were cloth. This width reduction may be achieved by means of a step, so as to define a shoulder, (or two steps on opposite sides to form two shoulders), and the reduced width region above the shoulder(s) provides the reduced width plastics face for engaging the woven wire cloth. The difference between such an arrangement and a triangular ridge is that in the former case, the underside of the woven wire cloth immediately to the left or right of a bonded crest will be completely unobstructed at least down to the shoulder(s) whereas in the case of a triangular ridge, a sloping surface will be presented to liquid filtering through the wire cloth. In practice however, the stronger triangular section is preferred particularly since differential softening will occur down the height of the ridge upon the application of heat to the crests.

Preferably the overall shape of the frame is a rectangle, and the flange which extends along the two longer sides is wider than the flange along the two shorter sides, and at least one of the shorter sides is adapted to be joined to the corresponding shorter side of a similar screen support frame, constructed in the same way as the first.

The invention also provides a sifting screen constructed from a support frame as aforesaid, with wirecloth stretched thereon and hermetically bonded thereto.

The invention also lies in two screens constructed as aforesaid when mounted in a supporting framework within a vibratory screening machine, with the shorter edges of the screen support frames joined so that the two screens form a larger area for filtering.

The invention also lies in a vibratory screening machine when fitted with two such screens, wherein one of the screens is mounted so as to be substantially horizontal in use and the other is mounted downstream of the first and is inclined upwardly in the direction of movement of particulate material through the machine.

The invention also lies in a support frame as aforesaid, wherein one of the shorter ends of the frame is adapted to interlock and sealingly engage with a corresponding edge of an adjoining similar support frame such that if the two frames are slid the one towards the other, engagement and sealing occurs merely by the sliding movement of the one frame relative to the other.

The sealing engagement of one frame to the other can be arranged to occur when the two frames are in line, or when the two frames are mutually angled.

It is an advantage to form screens in this way and to mount a number of such screens in a supporting framework within a vibratory screening machine with edges abutting so as to form a larger area for filtering, for a number of reasons.

Firstly, as already indicated, some designs of shaker require a first filtering area to be substantially horizontal and a second area to be inclined upwardly in the direction of particulate movements over the overall screen. This can be achieved by forming the overall screen from two smaller screens, each constructed as aforesaid and adapted to be joined edge to edge where the change in inclination is required to occur.

Secondly, each individual screen can, be of such a size and weight as can be readily handled by one man.

Thirdly in the event of damage occurring in one such screen, it can be simply removed and a fresh screen inserted (sometimes without needing to disturb the undamaged screen(s)).

In a support frame as aforesaid, preferably the cross section of each strut is generally rectangular and the longer dimension is generally perpendicular to the plane of the frame, and a first reinforcing wire extends through each strut near the edge thereof which is to be bonded to wirecloth, and a second parallel reinforcing wire extends through each strut near to the opposite edge thereof, and the wires are bonded to the plastics material by the moulding step and form therewith a beam, thereby to impart rigidity to the structure.

Furthermore, in a support frame as aforesaid, preferably the struts intersect similar struts which extend at right angles and a second assembly of parallel reinforcing wires is provided, running perpendicular to the first assembly of wires in planes proximate those containing the first said assembly, so that a pair of parallel spaced apart wires extends through each of the struts.

In such a support frame each reinforcing wire which aligns with the peripheral flange of the frame preferably extends into the flange at each end thereof, thereby to increase the rigidity of the flange.

Preferably the ends of the other wire of each pair are bent so as also to become aligned with the flange of the frame, and the bent ends thereof extend into the said flanges close to the ends of the first mentioned wire to further assist in reinforcing the said flanges.

Typically the wires touch at all points of intersection and are preferably welded at all such, points.

Preferably the ends of each pair of wires are welded where they occupy the flange.

In a wireframe assembly for a support frame as aforesaid, cross-point engagement may be introduced between parallel wires in the flange by incorporating intermediate transversely extending filler wire, or weld wire, between the wire ends.

Further reinforcing may be provided in the flange by means of additional reinforcing wires extending parallel to the length direction of the flange so as to overlie or underlie the protruding reinforcing wires entering the flange from the struts, and the additional reinforcing wires are welded to the protruding, reinforcing wire ends.

The invention leads to a filter screen comprising a support frame as aforesaid, having wirecloth bonded thereto, wherein the wires of the cloths are taut and under tension in the finished product, and to this end the wirecloths are put in tension at least while the frame material cools and sets hard, to bond the wirecloths to the frame.

According to another aspect of the invention, there is provided a method of repairing or refurbishing a filter screen constructed as aforesaid, wherein worn or damaged wirecloth is stripped from the surface of the polymer frame, fresh cloth is placed over the frame and tensioned as appropriate and heat is applied so as to soften the surfaces of the frame over which wirecloth is stretched, so that the latter can penetrate the softened plastics material and become embedded therein, after which the assembly is allowed to cool, the tensioning force is removed, and the wirecloth edges are trimmed back to the surrounding flange of the frame.

In a method of repair or refurbishment as aforesaid plastics material may be applied to the surface of the frame which is to receive the wirecloth before the latter is fitted thereover, to provide additional plastics material for bonding the wirecloth to the frame.

The stripped support frame may be inserted in a mould and fresh polymer material infected into the mould so as to reform on the surfaces of the frame ridges similar to those which existed when the frame was first manufactured, before the wirecloth is applied thereto.

The invention thus also provides a repaired or refurbished filter screen wherein worn or damaged wirecloth has been replaced by fresh wirecloth in accordance with the above.

Apparatus for repairing or refurbishing a filter screen from which worn wirecloth has been stripped conveniently comprises a tray into which the stripped frame is inserted, wirecloth stretching means surrounding the tray including attachment means for securing to the edges of a sheet of wirecloth laid over the upper surface of the frame in the tray, tensioning means for exerting tension or the wirecloth in at least two different directions whilst it is so stretched over the frame, means for heating the frame to soften the uppermost edges of the matrix of struts and periphery of the frame, and means for forcing the wirecloth into the softened material such that after cooling, the wirecloth remains bonded to the polymer frame, and can be trimmed back to the edges of the frame.

Apparatus as aforesaid may also comprise further attachment means and tensioning means to enable at least a second sheet of wirecloth to be secured over the first for bonding to the frame, preferably at the same time as the first.

In such apparatus additional means may be provided for applying plastics material along each of the surfaces to which the wirecloth is to be attached prior to or after wirecloth has been stretched over the support frame, so as to increase the amount of plastics material available to bond the wirecloth to the frame.

The invention also provides a method of repair or refurbishment, wherein after removing worn or damaged wirecloth from a support frame a plastics sheet similar in size and pattern of openings to the support frame when viewed in plan is placed over the frame which is to be repaired, in alignment therewith, before or after new wirecloth is stretched thereover and before heat and pressure is applied, to provide additional plastics material to bond the new wirecloth to the frame.

Filtering machines of the type into which screens as aforesaid can be fitted, are described in UK Patent Specifications Nos. 223752; and 2299771, but these are intended as examples only and the invention is not limited to the use of these screens in such machines.

The invention will now be described by way of example, with reference to the accompanying drawings, in which:

FIG. 2 is a cross-sectional view at CC of FIG. 1;

FIG. 3 is a part section at BB in FIG. 1;

FIG. 4 is a part section on AA in FIG. 1;

FIG. 5 is a part end view at D of the frame of FIG. 1 to an enlarged scale;

Figure 1:
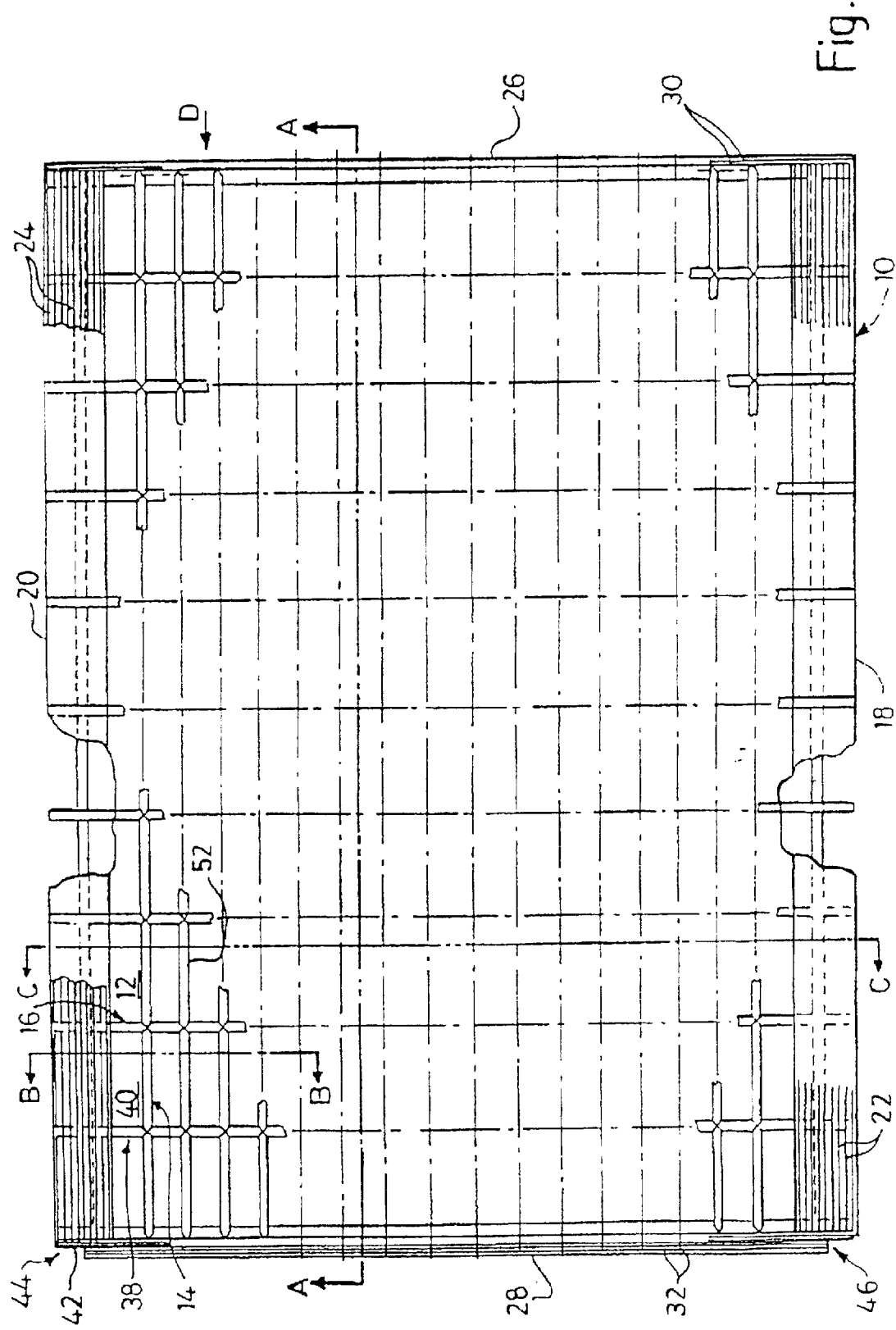
FIG. 1 is a plan view of a frame over which wire cloths are to be stretched and secured to form a screen for use a filter in a vibratory filtration equipment such as a shaker for separating solids from the liquid phase of oil and water based muds.
Figure 6:
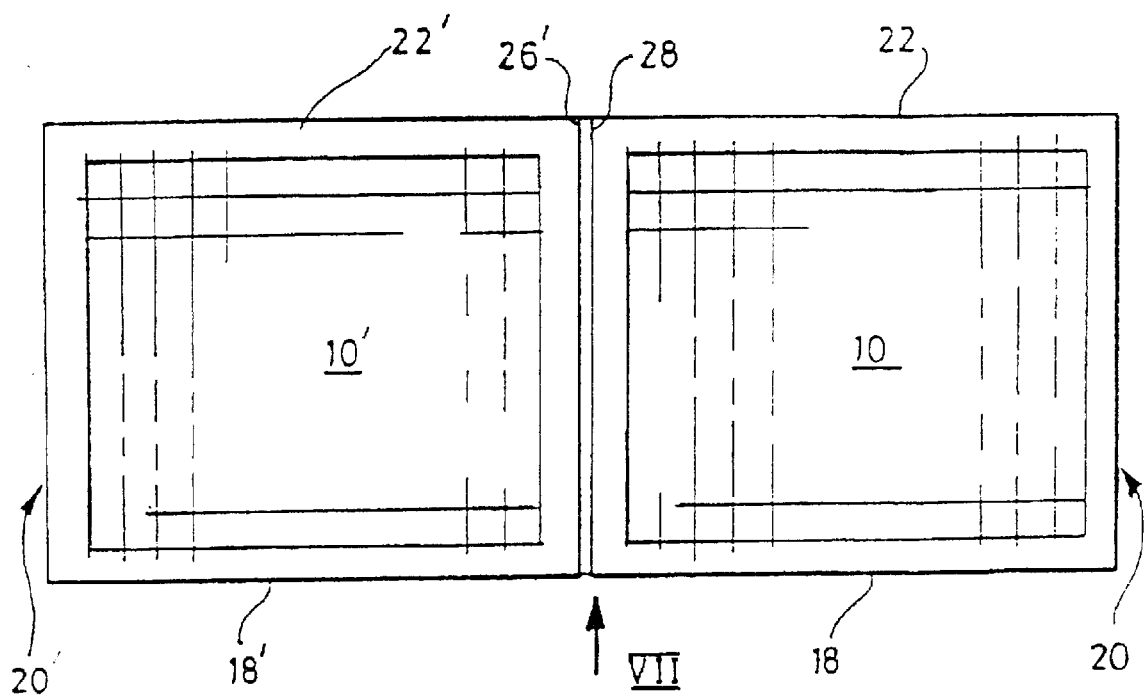
FIG. 6 is a plan view to a reduced scale showing two screens, each constructed using a frame such as shown in FIG. 1, in aligned edge abutting relation, to form a larger screening area.
Figure 7:
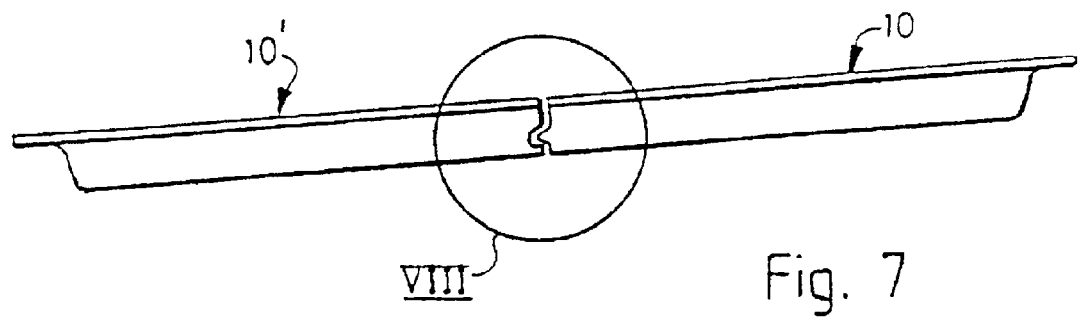
FIG. 7 is a side elevation in the direction of arrow VII of FIG. 6.
Figure 8:
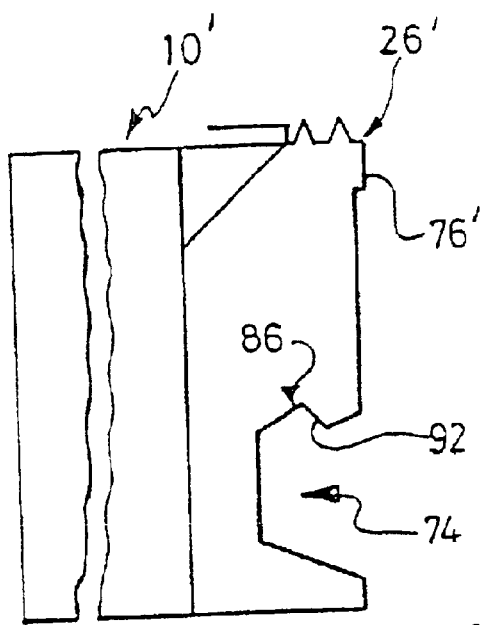
Figure 9:
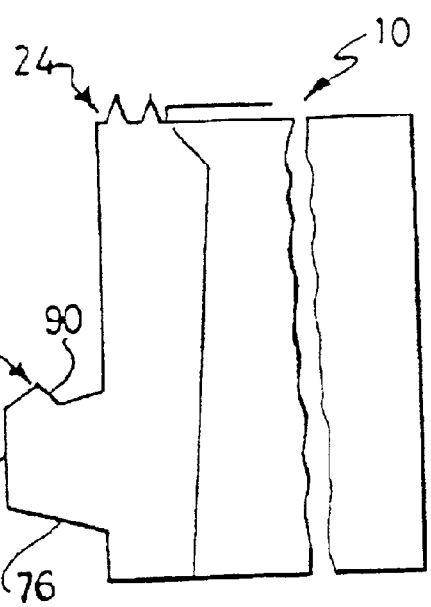
Figure 10:
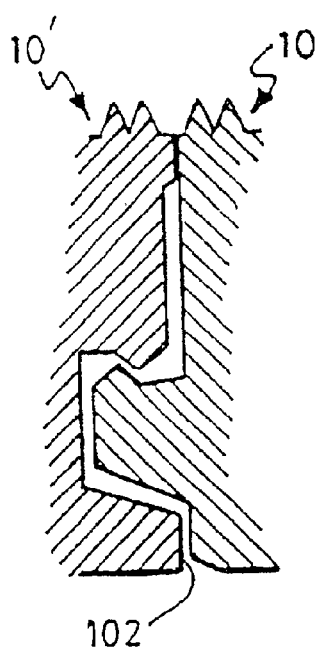
Figure 15:
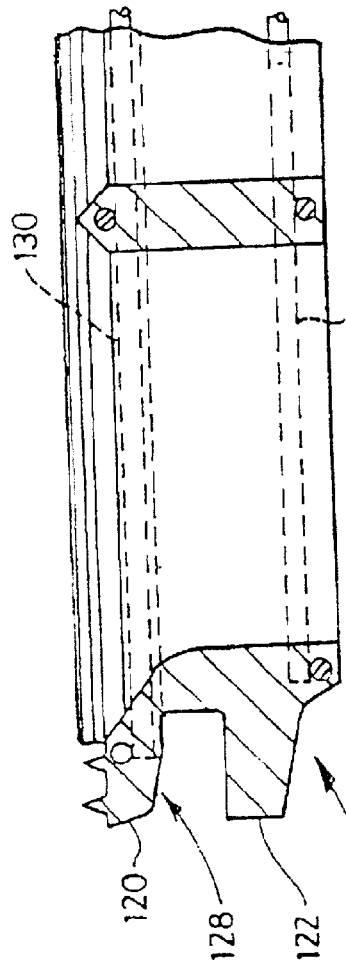
Figure 16:
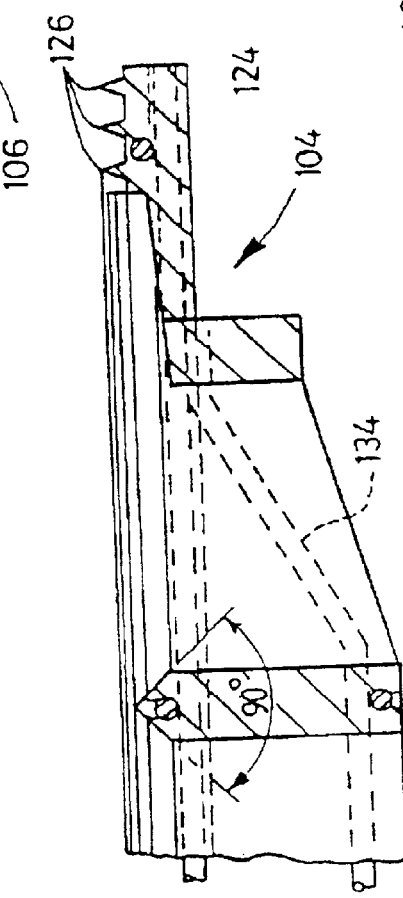
Figure 17:
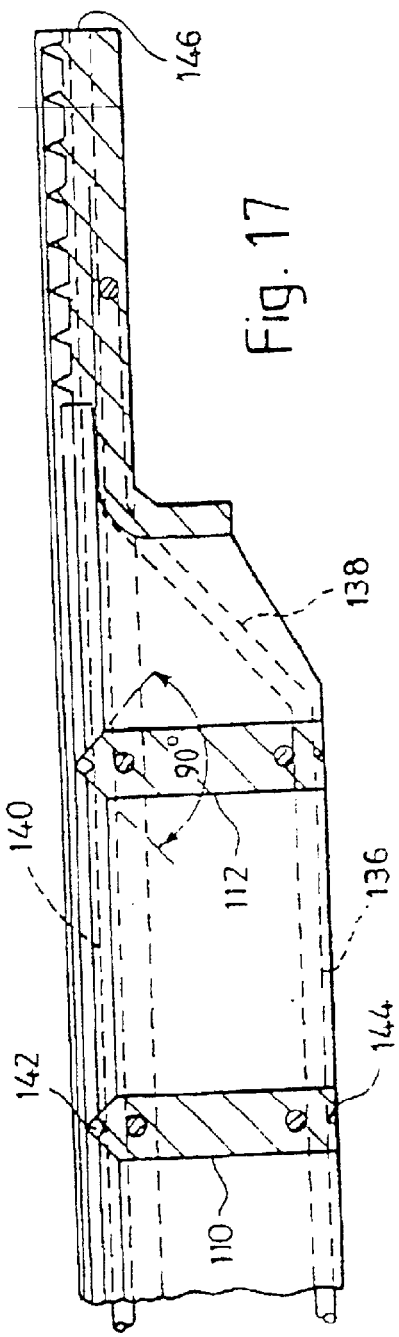
Figure 17A:
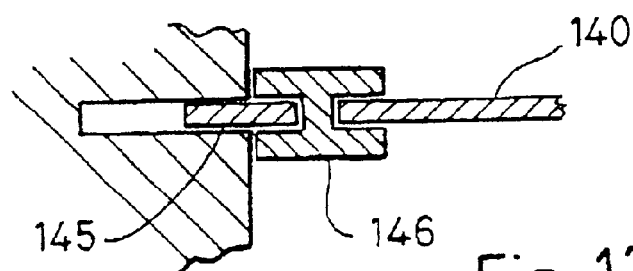
Figure 17B:
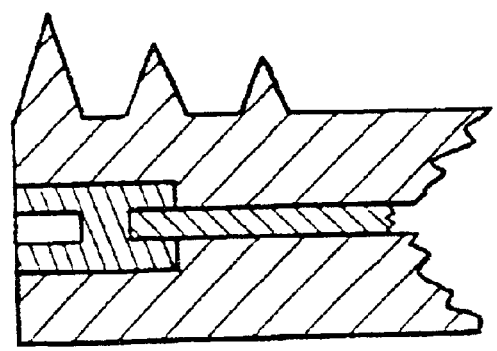
Figure 17C:
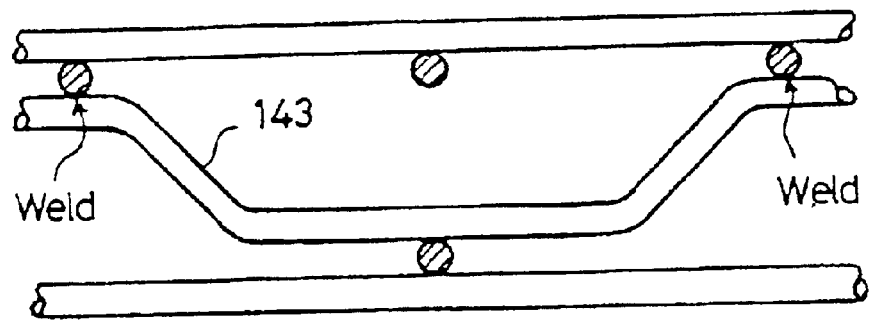

FIGS. 8 or 9 show to an enlarged scale the two inter-engaging edge regions of the two frames of FIGS. 6 and 7;

FIG. 10 shows to enlarged scale in cross-section the abutting region of the two frames shown circled at VIII in FIG. 7;

FIG. 11 is a plan view from above of another frame similar to that of FIG. 1, but adapted to be joined in edge abutting relation with another similar frame so that the two frames are angled relative to one another when viewed from the side;

FIG. 12 is an end view at "B" in FIG. 1;

FIG. 13 is a section on DD in FIG. 11;

FIG. 14 is a part end view (to an enlarged scale) at "B" in FIG. 11;

FIG. 15 is a part section a AA of the left hand end of the frame shown in FIG. 11;

FIG. 16 is a part section at AA of the right hand end of the frame of FIG. 11 showing in more detail the wire reinforcing structure, and where inserts are required to support it within a mould tool;

FIG. 17 is a part section at CC (to an enlarged scale) of the frame of FIG. 11;

FIGS. 17A and 17B show how the wire frame can be supported within a mould tool by ferrules which become an integral part of the moulded frame to cover the ends of the wires;

FIG. 17C shows a bent-wire spacer to prevent wireframe collapse in the mould tool, as polymer is injected finder pressure.

Figure 19:
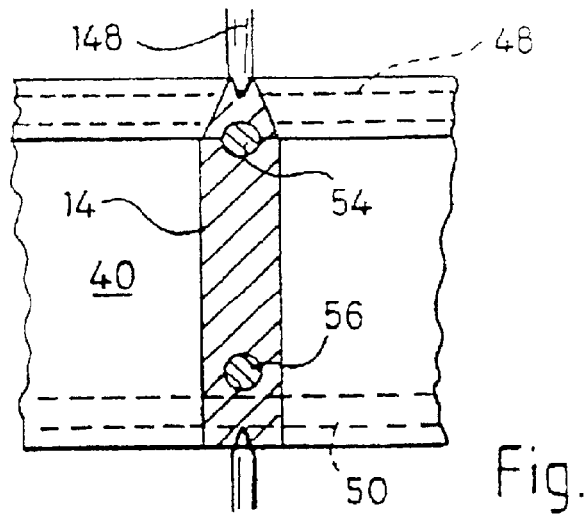
Figure 20:
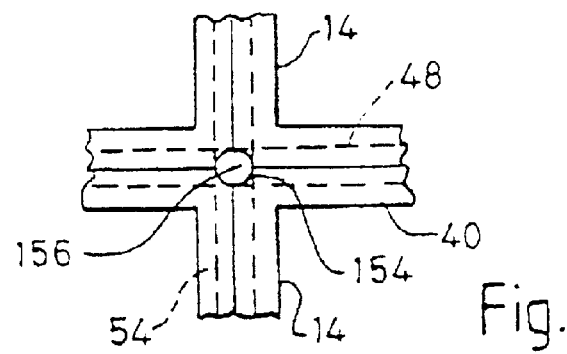
Figure 21:
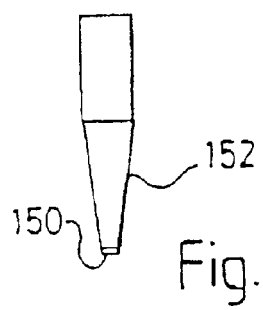
Figure 22:
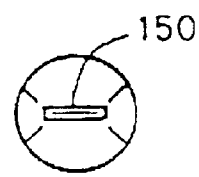
Figure 23:
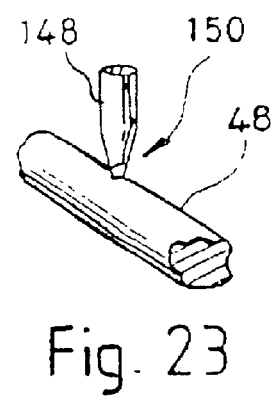
Figure 24:
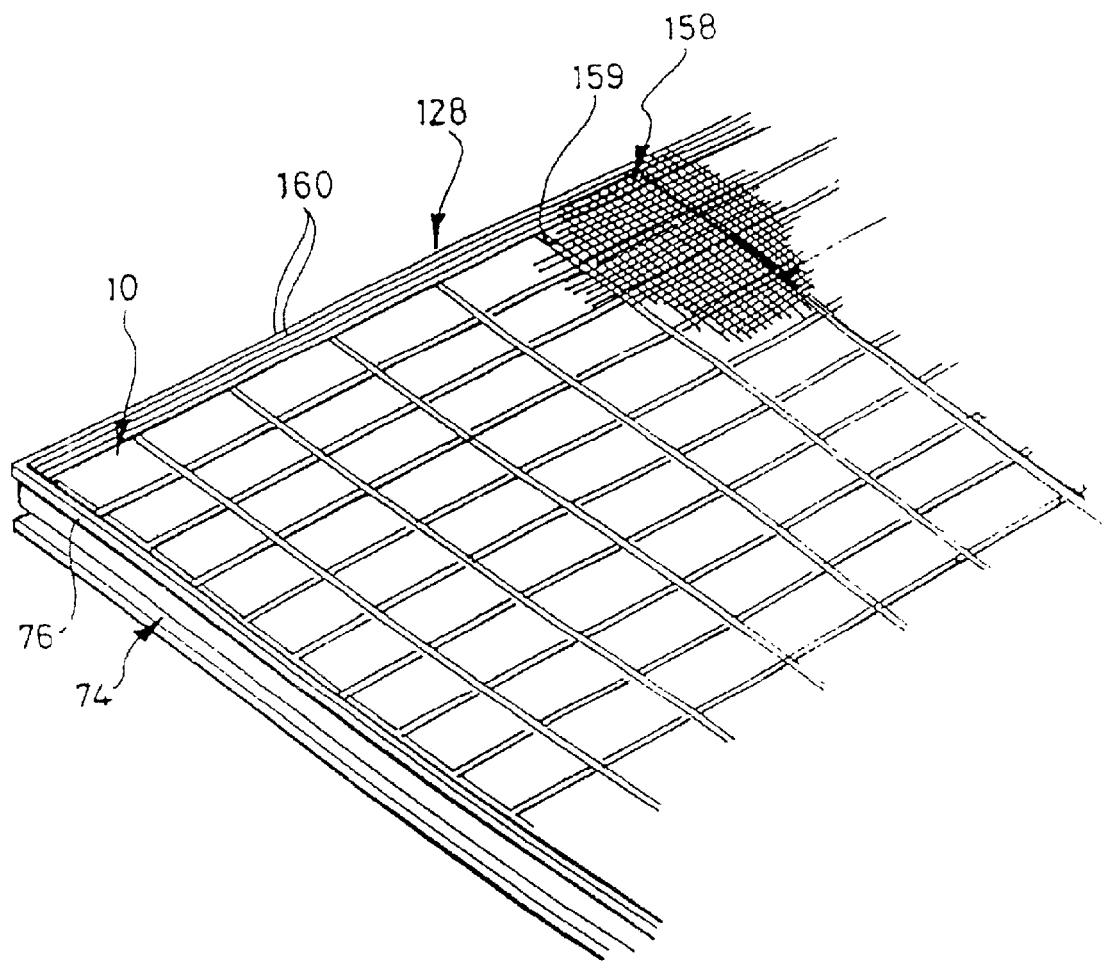

FIG. 18 is a side edge view of two frames of the type shown in FIG. 11, in edge abutting engagement;

FIG. 18A is a view of the join to an enlarged scale;

FIG. 19 is a side elevation partly in cross-section of an intersection between row and column support members of a frame such as shown in FIG. 1;

FIG. 20 is a top plan view of the frame part shown in FIG. 19;

FIG. 21 is an elevation of a support for locating the wire reinforcing structure at a point of intersection as shown in FIGS. 19 and 20;

FIG. 22 is an end view to an enlarged scale of the lower end of the support of FIG. 21;

FIG. 23 shows to a larger scale the preferred engagement of the chisel end of the stand off support with a reinforced rod; and FIG. 24 shows part of a completed screen.

DETAILED DESCRIPTION OF THE DRAWINGS

FIG. 1 illustrates a frame across which woven wire meshes are to be stretched and bonded in the manner herein described. The frame is generally designated 10 and includes a large number of similarly sized rectangular openings, one of which is denoted by 12 formed by a rectilinear matrix of orthogonally intersecting cross-members one of which is designated by 14 and another of which is designated by reference numeral 16.

On two opposite sides, namely 18 and 20, the frame includes a relatively wide flange the upper surface of which is corrugated so as to form ridges and furrows 22. The other two edges 24, 26 and 28 are relatively narrow and include just two or three ridges 30, 32. By forming at least the ridges from a plastics material which can be softened on heating and which sets hard on cooling, woven wire meshes (not shown) can be stretched over the ridged peripheral regions of the frame and embedded in the ridges by heating the peripheral edges of the frame and pressing the wire meshes into the softened crests of the ridges. By allowing the plastics material to cool, so the wire meshes will be held firmly in place and if they are tensioned in both directions prior to the heating step and the tensions are maintained throughout, thereafter the plastics material has cooled, residual tensions will remain in the stretched layers of wire cloth. If as is usually preferred, the wire cloths have been differentially tensioned so that the tension in one is higher than that in the other, the differential will remain in the residual tensions retained in the wire cloths.

By forming similar ridges along the top of each of the orthogonal cross-members, and arranging that the ridges of the cross-members are engaged by the wire cloth after the latter have become embedded in the ridges of the surrounding flanges, by heating over the whole surface area of the frame, so the woven wire meshes will become secured to the crests of the crossing members which when the assembly cools, will hold the woven wire cloths firmly in place, and provide additional support therefor.

In a typical example, the first wirecloth will have a mesh size of approximately 30 and the second cloth a mesh size in the range 100-300. Each is made from annealed stainless steel wire—that making up the first cloth typically having a diameter of the order of 0.28 mm.

In accordance with a preferred aspect of the invention, the frame is formed from a plastics material which may be reinforced with glass fibres or similar reinforcing material and the edge regions and the crossing members of the frame are all reinforced with elongate steel wires which are welded together to form a wire frame reinforcing structure in a manner which will be described later. Typically steel wire of 2.5 mm diameter is used to construct the reinforcing wire frame.

A frame such as shown in FIG. 1 is typically formed by inserting the reinforcing framework into a suitable mould tool and injecting plastics material under pressure into the cool so that the wire reinforcing frame becomes completely encased within plastics material (typically reinforced with glass fibre) so that on release from the mould, the reinforcing wires are totally encased within plastics material.

The section at CC in FIG. 2 shows the cross member 14 in section and the orthogonal cross member 16 is seen extending on either side of 14. The edge regions 18, 20 are reinforced by frame members 34 and 36.

The cross-section at BB in FIG. 1 is shown in FIG. 3. The cross member 14 is still visible but the orthogonal cross member 38 is now shown intersecting 14 and the opening intersected by BB is denoted 40.

Ridges such as 24 in the upper surface of the relatively wide edge flange 20 can be seen, as can also the inner of the two ridges along the narrower edge 28, namely ridge 42 which is also identified in FIG. 1 for reference purposes. The ridged end 28 is cut away at opposite ends at 44, 46 as shown in FIG. 1.

Also shown in FIG. 3 are some of the metal reinforcing rods forming the reinforcing framework. Two rods designated 48 and 50 extend through the upper and lower regions respectively of the cross member 38.

Similar pairs of rods extend through the upper and lower regions of each of the parallel cross members such as 16.

Through each of the orthogonally extending cross members designated 14 and 52 respectively, extend two similar pairs of rods designated 54 and 56, and 58 and 60 respectively. At the points of intersection between the rods they are welded together as by electric resistance welding.

Further reinforcing rods 62 and 64 extend parallel to rods 54 and 58 through the edge region 20, and this is resistance welded to the extended ends of the rods 48 etc where they extend into the flange 20.

The extensions of the lower rods such as 50 are bent upwardly as shown at 66 so as to extend co-extensively with or in contact with the underside of the upper rod of the pair eg extension of rod 48 and are resistance welded thereto. In this way the upper layer of intersecting and welded rods such as 48, 54, 58, 62, 64 is secured to the lower layer of rods such as 50, 56, 60, to form a unitary reinforcing structure.

FIG. 4 is a part section on AA to a larger scale than FIG. 1 which allows the ridges 30 and 32 to be seen in section at the ends of the frame which are to be butt-joined.

FIG. 4 also shows detail of the male and female locking arrangement at opposite ends of the frame. Thus at the left hand end an elongate protrusion 68 stands off from the left hand end face 70 and extends across the entire width of the frame, whilst at the other end of the frame the end face 72 is cutaway to define a rebate 74 to receive the protrusion 68 of an abutting frame.

The end face 72 also includes an upstand 76 which cooperates with the opposite end region of the end face 70 of the abutting frame, to space the two end faces from each other by the thickness of the upstand 76. This also assists in seating the rebate 78 in the protrusion 68 correctly below the lp 80 along the upper edge of the rebate 74.

FIG. 4 also shows the small openings which can be left above the intersection point of the reinforcing grid if stand-off pits, or stools, are used in the mould tooling to position the reinforcing grid within the tooling. Two of these are visible at 82 and 84.

FIG. 5 is a part end view in the direction of arrow D in FIG. 1 and shows the upstand 76 and the end face 72 of the right hand end of the frame as depicted in FIG. 4. Likewise the lip 80 is also shown together with the undercut 86 in the underside of the shoulder created by the rebate 74.

FIG. 6 shows how two frames 10 and 10' each similar to that shown in FIG. 1 can be joined, with the two edges 26', 28 abutting/engaged as will be described more fully with reference to later figures of the drawings.

In use the wider flanges 18 and 20, 18' and 20' and one end flange 28' are gripped in an appropriate manner within the basket of a shaker assembly. The end Flange 20 may in fact only be supported on its underside in order to permit solids material to progress over that edge unimpeded during shaking.

An inflatable grip seal may be used along the edges 20, 20', 28', 18' and 18.

As shown in FIG. 7, the two frames 10 and 10' may be aligned and in some shakers advantageously the aligned frames are mounted so as to be inclined to the horizontal so as to describe an uphill slope up which the mud which is to be filtered climbs as a result of the shaking movement. Typically the shaking movement has components generally in the direction of the alignment of the two frames and generally perpendicular thereto.

The two separate parts forming the abutment are shown to an enlarged scale in FIGS. 8 and 9, and detail of the engagement is shown in FIG. 10. FIG. 9 shows the edge 28 which includes the protruding nose generally designated 68 which extends across the width of the frame and fits below the shoulder 80, of the rebate 74 of the cooperating frame 10.

The upstand 76 may comprise a separate member in the form of a seal which may be of plastics material or rubber or a composite thereof. Alternatively as shown it may simply comprise a protruding ridge formed during moulding, in the material from which the rest of the frame is constructed.

When mounting the two frames in a shaker, frame 10' is first introduced into the shaker basket and thereafter frame 10. By raising the right hand end of frame 10 (as viewed in FIG. 6) so that the frame 10 is angled relative to the plane of frame 10', the nose 68 can be inserted below the shoulder 80 into the undercut 86 of the rebate 74 so that the ridge 88 of the protrusion 68 engages in the undercut 86 behind the shoulder 80. Once 88 is within 86, the frame 10 can be lowered so as to be in alignment with 10' and by choosing the dimensions carefully, in that condition only, the inclined surface 90 engages the inclined underside 92 and the upstand 76' makes contact with the face 70 of the other frame end. This is more clearly shown in FIG. 10.

By dimensioning thus any fluid trapped between the ends of the frame as the two frames are pushed together, can be squeezed through the gap left between the surfaces to facilitate drainage through the lowermost gap visible in FIG. 10.

In some shakers, it is preferred that the two screens such as shown in FIG. 6, (each formed by a frame wash woven meshes stretched thereover) are inclined relative one to the other instead of being aligned as shown in FIG. 7. To this end an alternative edge configuration may be incorporated, by arranging that one frame end can be fitted into the other with a small step between the two upper surfaces.

FIG. 11 is a plan view of such a frame.

FIGS. 12, 13 and 14 provide edge and section views to an enlarged scale of the case of FIG. 14, of the frame shown in FIG. 11.

Essentially the construction of the central area of the frame is similar to that of the frame of FIG. 1. Thus the meshes are secured to external flanges 100, 102, 104 and 106 and to the upper edges of intersecting orthogonal cross members such as 108, 110, 112 etc.

The relatively wide flanges 100 and 102 are visible in FIGS. 12 to 14, together with the cross members 110, 112.

Each of the intersecting cross members is ridged along its upper edge as best seen from the hidden detail of items 110, 112 in FIG. 14. The ridges are identified by reference numerals 114, 116 and it will be noted that the peaks of the ridges 114, 116 are just below the peak of the ridges 118 along edge 106 (see FIG. 11). This ensures that when the GRP material is heated to accommodate the wire meshes, the heating and welding of the meshes to the outer regions 100 to 106 of the frame occurs prior to that over the central region made up of intersecting cross members 108, 110 etc.

The ends 104, 106 are designed to be capable of interengagement and accordingly the end 106 is formed with a pair of jaws 120, 122 which extend across the entire width of the frame end and can receive the opposed end 104 of a second frame (not shown) This opposed end comprises an extended flange 124 having three ridges 126 formed in its upper surface, the height of the flanges combined with the thickness of the flange 124 being equal to the internal spacing between the upper and lower jaws 120, 122, so that an end 124 can be pushed into the elongate slot formed by a pair of jaws 120, 122.

At 128 the underside of the upper jaw diverges upwardly away from the lower jaw, to assist in entering the end 124 therein. Being formed from a plastics based material, the ridges 126 are deformable, and by dimensioning the gap between the jaws 120, 122 accurately, so the flange 104 can become firmly wedged in the gap between those jaws, the ridges 126 forming a partial seal between the flange 124 and the underside 128 of the upper jaw 120 of end flange 106.

As with the frame illustrated in FIGS. 1 to 10, the frame of FIG. 11 includes a grid of reinforcing rods, welded or otherwise joined at the interstices of the grid, and constructed from upper and lower layers—generally designated 130, 132 respectively—see FIG. 15. The ends of the lower layer of rods are bent upwardly as at 134 in FIG. 16 to be welded to the aligned rods of upper layer in the end flange 104.

The upper and lower layers of rods terminate without converging at the other end of the frame as can be seen from the part section of FIG. 15.

The two edges 100 and 102 are reinforced in the same way as is end flange 104, and the ends of the rods 136 of the lower layer are bent upwardly as at 138 in FIG. 17, to merge with and be welded or otherwise joined to the upper rods 140.

All the rods are wholly contained within the rectilinear array of intersecting cross members except at the flanged edges of the frame.

The part section of FIG. 17 is taken on the line CC in FIG. 11 and cross members 110 and 112 are denoted in both figures.

FIG. 18 shows how two frames such as shown in FIGS. 11 to 17 can be fitted so that one lies at a shallow angle relative to the other. The one frame is denoted 14.

FIG. 18A shows a modified interengagement possibility similar to the engagement of an end such as 126 in an elongate "socket" between jaws such as 120, 122—but in which both ends are "female" (ie equivalent to end 106), and the upper flange of the one can be received and wedged, into the socket of the other and a good seal is maintained. Similar reference numerals are employed to denote items in common as between FIG. 18A and earlier and later figures.

As also shown in FIG. 17, plastics support inserts or stools such as denoted by 142, 144 may be located in the mould tool so as to engage the interstices of the intersecting rods, thereby to correctly space the framework within the mould tool when the latter is closed.

In an alternative spacing arrangement, the spacing and positioning may be achieved by fingers protruding from the inside surfaces of the mould tool, and any openings in the plastics moulding may be filled by appropriate material after the tool has been opened and the moulded component has been removed, or may be filled by the plastics material from which the struts are formed when the frame is subjected to heat and pressure during the manufacturing process.

Preferred arrangements utilise stand-off supports or stools since these can be used not only to centre the reinforcing framework within the mould tool, but where the framework has been constructed so as to bow slightly upwardly and downwardly, they will redefine the correct spacing between the upper and lower arrays of rods, when the mould tooling is closed. A preferred form of such stand-off support is illustrated and described with reference to FIGS. 19 to 23.

In order to prevent moulding pressure within the tooling from forcing the upper and lower walled arrays of rods/wires together so as to reduce the spacing therebetween, spacers 143 (typically bent wires, formed to one or other of the two arrays and permitting relative movement towards each other beyond a critical dimension defined by the spacers) are provided, as shown in FIG. 17C.

In a similar way, plastic ferrules such as that shown in FIG. 17 and denoted by 146, can be inserted into the mould tool so as to cover the ends of the rods which might otherwise be left exposed.

In a preferred mould tool, the welded reinforcing framework is supported in one part of the tooling by four retractable pins (145), two on opposite sides of the framework, by means of double ended plastics ferrules (146) which are each fitted at one end onto an end of one of the rods (140) making up the framework, and at the other end onto one of the retractable pins. After moulding, the pins (145) are retracted from the blind holes in the ferrules (146) which will have been embedded in the GRP during moulding, to permit the moulded article to be removed from the tooling.

An example is shown in FIGS. 17A and 17B.

Where support inserts or ferrules protrude after moulding, they can be removed by cutting or filing.

As mentioned in relation to FIG. 11 et seq, the crests of the ridges in the edge flanges of the frame shown in FIGS. 1 to 10 may also lie in a different plane from the crests or the ridges on the cross members such as 14 and 16, and in a preferred arrangement one or more of the outer ridges along the C flanges such as 18, 20, 26 and 28 extend(s) above the plane containing the crests of the crests of the cross members such as 14, 16. In this way the peripheral regions of the frames contain a greater amount of plastics material to be heated and softened before the woven wire mesh cloth can be forced thereinto, than exists along the cross-members. Bonding of the peripheral regions therefore has to occur before the cloths can come into contact with, and become bonded into the crests of the cross members 14, 16 etc.

FIGS. 19 to 23 show, to different, and generally an enlarged scale, the location of preferred stand off supports for the reinforcing rods. Here each support comprises a tapering chisel-ended metal pin 148 as shown in FIG. 19. The chisel end 150 is best seen in FIG. 21.

As shown in FIG. 23, the pins are arranged so that each chisel end 150 extends generally perpendicularly to the length dimension of the rod 48 which it will engage in the mould tool.

By virtue of the chisel end 150, and the taper 152, liquid plastic material flows around the tapering, chisel ends in such a way as to leave similarly tapering recesses such as 154 in the crests of the cross members of the frame when the tool is opened and the chisel ends are extracted from the moulding. Each recess left by a pin 148 therefore only exposes a tiny area 156 of the wire (see FIG. 20).

When woven wire cloths are stretched over the crests of the frame and the cloths and frame are heated, the plastics material flows into the lower end of each recess left by a chisel end, such as 150. This fills the tiny area to provide a barrier between the wire mesh(es) and the reinforcing rods such as 48 (see FIG. 3).

FIG. 24 is a perspective view of the female end of the frame 10' of FIG. 9.

The sealing ridge 76 can be seen above the groove 74 into which the elongate male "nose" 68 (see FIG. 9) fits.

Across the frame are stretched woven wire cloths, the upper one of which is shown in part at 158 and the lower, in part, at 159. Two such cloths, one above the other, are stretched over the frame, the mesh of the lower cloth being coarser than that of the upper cloth, and with the tension in the lower cloth being greater than that in the upper.

By heating at least the upper surface of the frame, and applying uniform downward pressure on the cloths, the crests of the plastics frame will soften and allow the wire cloths to sink into the crests, which will also become flattened into the process. On cooling the plastics material hardens and secures the wire cloths in place.

The crests of the outermost ridges 160 on the flange extend upwardly above the crests of the inner ridges of the same flange.

The land area at the junction between two screens such as shown in FIGS. 7 and 18 should be as small as possible so as not to impede the progress of particulate material from one screen to the next.

Likewise the front edge of the screen where solids traverse over and off the edge, for example into a skip, should also be as small in area as possible.

The joint provided by interfitting ends such as shown in FIGS. 18, 18A, causes the edge 120 of the upper frame to overlie wire mesh of the lower frame. The non-screening dead area is thereby reduced to the minimum, ie the ridged end 120.

The joint provided by the engagement such as shown in FIGS. 18, 18A also seals the joint and prevents fluid leakage, and has been found to reduce the risk of bounce between one frame and the other across the joint. This appears to be achieved due to the formation of a structural member by the reinforcing wires and where these are tensioned, as is the case when the framework is pushed from above and below in the mould tool, the framework and plastics material will significantly resist bending and therefore minimise any tendency to bounce.

Flash heating is preferably used to bond the wire cloths to the crests.

Weld wires are conveniently employed between overlying parallel rods such as 48, 66 (see FIG. 3) as designated by reference numeral 49.

The drawings and related description of UK Patent Specifications 2237521 and 2299771 are referred to as illustrating filtering machines of the type in which screens as described herein may be mounted.

What is claimed is:

1. A method of constructing a polymer support frame over which woven wire cloth is to be stretched and secured to form a sifting screen, the method comprising the steps of:locating in a mould tool a reinforcing wire frame assembly comprising two parallel stated apart arrays or reinforcing wires:

(a) closing the mould tool;

(b) injecting liquid polymer into the mould tool by injection moulding so as to wholly encapsulate the wire frame and to form an article having an open central region criss-crossed by intersecting orthogonal ribs bounded on all sides by a rigid flange, the article being such that each of said ribs includes two parallel spaced apart wires of said frame assembly;

(c) exerting an inward force an opposite faces of the wire frame assembly within the mould tool by fingers protruding inwardly from inside faces of the tool, said fingers being operable to engage the arrays when the tool closes, the fingers comprising inwardly projecting pegs which align with crossing points of wires in the upper and lower reinforcing matrices, to space the arrays from the corresponding upper and lower internal surfaces of the mould tool and ensure that the arrays are buried within the plastics material which is injected into the mould tool during the manufacturing process, and the ends of the pegs taper to an edge, or a point and wherein after the mould tool is opened the protruding pegs disengage from the struts leaving openings in the polymer, and the method further comprises the step of plugging the openings with plastics material or filler, (d) permitting the polymer to cure; and (e) opening the tool; and removing the article.

2. A method according to claim 1 wherein the polymer is a glass-reinforced plastics material.

3. A method according to claim 1 wherein the faces of peripheral edge regions of the support frame over which woven cloth overlies and to which the cloth is to be bonded by heating are formed during manufacture with a plurality of substantially parallel ridges, the ridges being susceptible to soften on heating to bond onto the cloth laid thereover so that the cloth penetrates and becomes embedded in softened crests cite ridges.

4. A method according to claim 3, in which said edge regions include an outer peripheral flange surrounding a central region occupied by an integral matrix of interconnecting struts, the flange and struts are formed with ridges where they engage the wirecloths, and the ridges extend to different heights so that corresponding crests of the ridges lie in different parallel planes.

5. A method according claim 1 wherein spacers are located within the wire frame assembly, each attached to one or other of the arrays of reinforcing wires so as to extend towards the other, whereby any tendency for the arrays to collapse inwards during moulding, is resisted by the spacers.

6. A method according to claim 1 wherein the wire frame assembly is supported within the mould tool by means of retractable pins which protrude through the tooling wall to engage the assembly and accurately locate it within the mould tool, and the pins are retracted as the mould tool opens after the moulding step has been completed.

7. A method according to claim 6 wherein the pins align with protruding ends of wires snaking up the wire frame assembly and are separably joined to the ends of the wires by means of sleeves of plastics material which is compatible with or the same as the polymer used to form the support frame, and apposite ends of the sleeves receive the pins and the reinforcing wire ends respectively, and wherein the passage through each sleeve is blocked so as to form two coaxial blind bores, each sleeve becomes embedded in the polymer during moulding and remains in the polymer as the pin which engages it is retracted as the tooling is opened, the blocked passage serving to encapsulate the end of the wire end located in the inner end of the sleeve.

8. A method according to claim 7 wherein prior to moulding the tool is fitted with the pegs, and the pegs become integrally bonded to the polymer material during moulding so that when the tool is opened, the pegs separate from the tool, and remain in the polymer support frame, and portions of each peg protruding from the support frame are removed by grinding or tiling or cutting.

9. A method of constructing a polymer support frame over which woven wire clot is to be stretched and seemed to form a sifting screen, the method comprising the steps of:
  (a) locating in a mould tool a reinforcing wire frame assembly comprising two parallel spaced apart arrays of reinforcing wires;
  (b) closing the mould tool;
  (c) injecting liquid polymer into the mould tool by injection moulding so as to wholly encapsulate the wire frame and to form an article having an open central region cries-crossed by intersecting orthogonal ribs bounded on all sides by a rigid flange, the article being such that each of said ribs includes two parallel spaced apart wires of said frame assembly;
  (d) supporting the wire frame assembly within the mould tool by means of retractable pins which protrude through the tooling wail to engage the assembly and accurately locate it within the mould tool, and the pins are refracted as the mould tool opens after the moulding step has been completed; wherein the pins align with protruding wires making up the wire frame assembly and are separably jointed to the ends of the wires by means of sleeves of plastics material which is compatible with or the same polymer used to form the support frame, and opposite ends of the sleeves receive the pins and the reinforcing wire ends respectively, and wherein the passage through each sleeve is blocked so as to form two coaxial blind bores, each sleeve becomes embedded in the polymer during moulding and remains in the polymer as the pin which engages it is retracted as the tooling is opened, the blocked passage serving to encapsulate the end of the wire end located in tire inner end of the sleeve;
  (e) permitting the polymer to cure; and
  (f) opening the tool; and removing the article.

10. A meted according to claim 9, wherein an inward force is exerted on opposite fazes of the wire frame assembly within the mould tool by fingers protruding inwardly from inside faces of the tool, said fingers being operable to engage the arrays when the tool closes.

11. A method according to claim 9 wherein the polymer is a glass-reinforced plastics material.

12. A method according to claim 9 wherein the faces of peripheral edge regions of the support frame over which woven clot overlies and to which the cloth is to be bonded by heating are fanned during manufacture with a plurality of substantially parallel ridges, the ridges being susceptible to soften on heating to bond onto the cloth laid thereover so that the cloth penetrates and becomes embedded in softened crests of the ridges.

13. A method according to claim 12, in which said edge regions include an outer peripheral flange surrounding a central region occupied by an integral matrix of interconnecting struts, the flange and struts are formed with ridges where they engage the wirecloths, and the ridges extend to different heights so that corresponding crests of the ridges lie in different parallel planes.

14. A method according claim 9 wherein spacers are located within the wire frame assembly, each attached to one or other of the arrays of reinforcing wires so as to extend towards the other, whereby any tendency for the arrays to collapse inwards during moulding, is resisted byte spacers.

15. A method according to claim 9 wherein the fingers comprise inwardly projecting pegs which align with crossing points of wires in the upper and lower reinforcing rays, to space the matrices from the corresponding upper and lower internal surfaces of the mould tool and ensure that the arrays are buried within the plastics material which is injected into the would tool dining the manufacturing process, and the ends of the pegs taper to an edge, or a point, and wherein after the mould tool is opened the protruding pegs disengage from the struts leaving openings in the polymer, and the method further comprises the step of plugging the openings with plastics material or filler.

16. A method according to claim 9 wherein prior to moulding the tool is fitted with the pegs, and the pegs become integrally bonded to the polymer material during moulding so that when the tool is opened, the pegs separate from the tool, and remain in the polymer support frame, and portions of each peg protruding from the support frame are removed by grinding or filing or cutting.

* * * * *